Aug. 20, 1935.  T. W. C. RUBY  2,011,985
AUTO TURN SIGNAL
Filed April 14, 1932   2 Sheets-Sheet 1
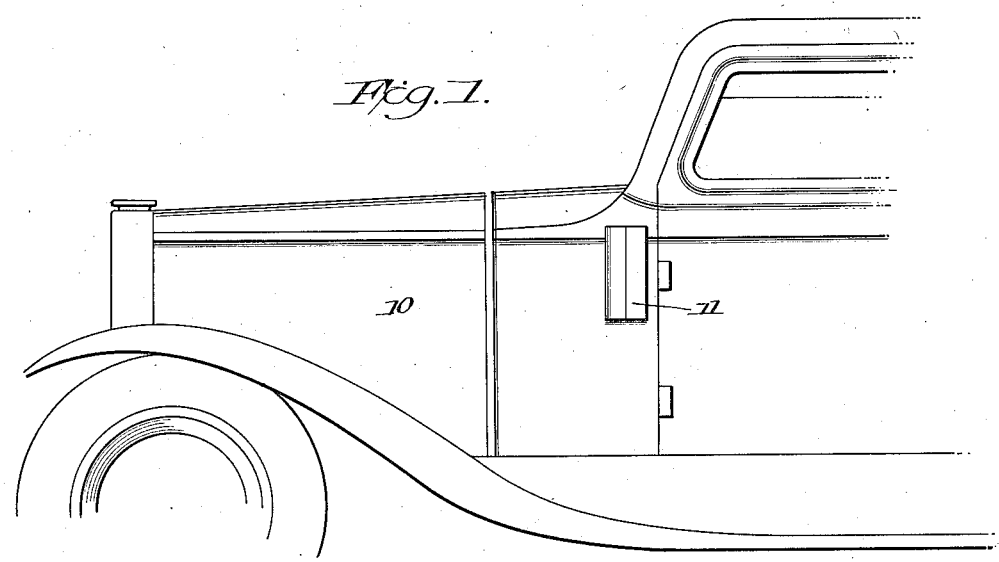
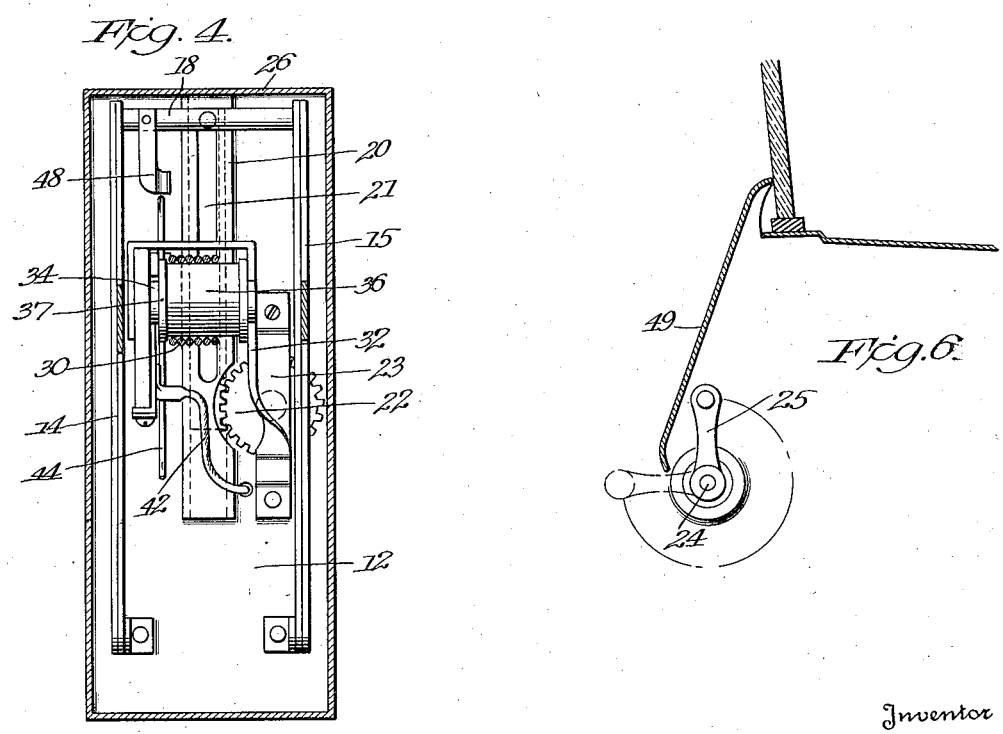
Inventor
Thomas W. C. Ruby

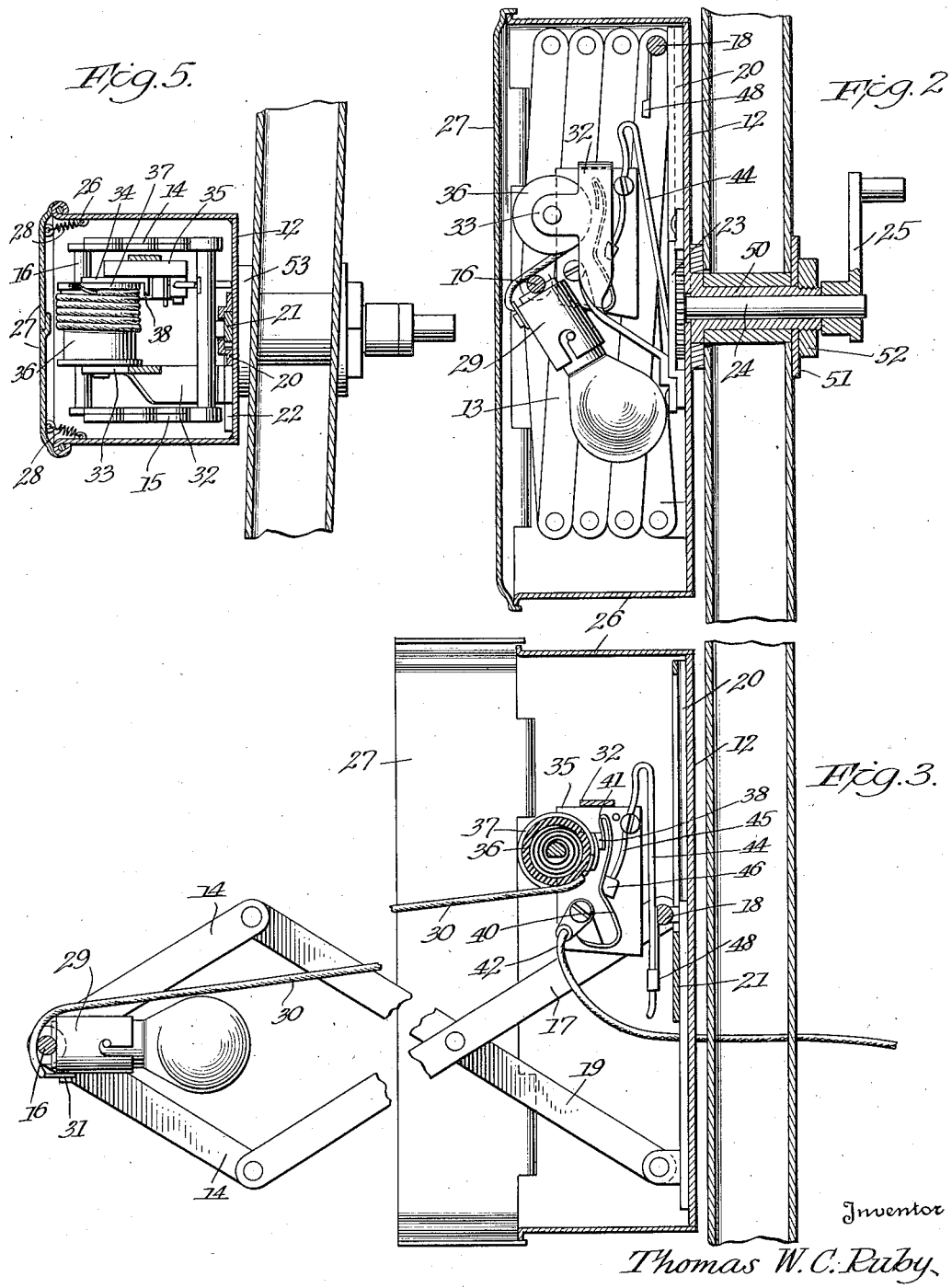

Patented Aug. 20, 1935

2,011,985

UNITED STATES PATENT OFFICE 2,011,985

AUTO TURN SIGNAL

Thomas W. C. Ruby, Chester, Pa.

Application April 14, 1932, Serial No. 605,305

10 Claims. (Cl. 177—329)

This invention relates generally to indicators or signals and refers particularly to a direction indicator adapted to be applied to automobiles, buses and other vehicles for signalling the intention of the operator to make a turn.

One of the objects of the present invention is to provide a simple, inexpensive and compact auto turn signal which may be easily and quickly installed on any form of vehicle.

Another object is to provide signal device which is conveniently located on a vehicle so as to be readily actuated by the operator thereof.

With these and other objects in view, the invention resides more particularly in the novel combination, arrangement and formation of parts hereinafter described, pointed out in the claims, and illustrated in the accompanying drawings.

In the drawings:

Figure 1 is a side elevation of the front portion of a vehicle showing my auto turn signal applied thereto.

Figure 2 is a vertical longitudinal section through the signal casing showing the signal in closed position.

Figure 3 is a view similar to Figure 2, showing the signal in extended operative position.

Figure 4 is a vertical transverse section through the signal casing.

Figure 5 is a horizontal transverse section through the signal casing, and

Figure 6 is a view showing the arrangement of the operating lever with respect to the instrument board.

Referring now to the drawings and particularly to Figure 1, there is disclosed a motor vehicle 10 of the closed car or sedan type. This is merely for the purposes of illustrating the use of my invention as it is readily adaptable to any type of vehicle. My auto turn signal is designated by the numeral 11 and while it may be positioned at any point within convenient reach of the operator, I have shown it attached to the side of the cowl in advance of the left front door, sufficient clearance being allowed for opening and closing the door.

The signal proper consists of a base plate 12 adapted to abut the side of the cowl and upon which is supported an extensible signal member 13. This signal member is of the lazy-tong type, and while it may function properly with a single extensible arm, I have shown it as comprising spaced extensible arms 14 and 15, respectively, said arms being secured at their outer ends by means of a cross-bar 16. The upper end portions of one set of inner links 17 are connected by means of a cross-bar 18, while the lower portions of the inner complementary links 19 are pivotally connected to the lower portion of the base plate.

The base plate is provided with a suitable longitudinal guide 20 within which is received a slidable rack bar 21, the upper end being secured to the cross-bar 18 centrally thereof. A pinion 22 is suitably positioned upon the base plate by means of a strap 23, and is adapted to mesh with the rack bar for moving the same within its guide. Pinion 22 is mounted upon a rotatable shaft 24 suitably journaled upon the base plate, and this shaft is adapted to extend through a hole or opening in the cowl and to project under the instrument board as clearly shown in Figure 2. A lever 25 is suitably clamped upon the inner end of the shaft, and may be easily grasped for operating the turn signal.

While it is not absolutely necessary to the operation of my device, I preferably provide an enclosing casing 26 having front complementary shutters 27 hinged to the casing and normally held in closed position by means of springs 28. This casing may be either permanently or detachably secured to the base plate as is desirable.

In the operation of the device, as thus far described, upon actuation of the lever 25, the pinion 22 is rotated to move the rack bar 21 downwardly upon the base plate, whereby the signal member is moved from a closed inoperative position to an extended outward position laterally of the motor vehicle. In this position it may be readily seen by motorists in rear of the vehicle, and will indicate that the operator intends to make a turn.

In its closed inoperative position, my auto turn signal is completely concealed from view within the casing or housing 26. If the signal arm is extended, the outer link portions engage the shutters and gradually force them to open position, where they are held until the signal arm is again retracted to its inoperative position, whereupon, because of the springs 28, the shutters are moved to their closed position, completely concealing the signal arm from view.

If desirable, a brilliant or any suitable indicating means may be secured to the cross bar 16. I prefer, however, to include in my construction an electric lamp which may be visible at night, the arrangement being such that as the arm is extended, the lamp circuit will be closed to light the lamp. Specifically, I mount a lamp socket 29 upon the cross bar 16. This socket may be of any conventional type having one of its terminals in electrical contact with the cross bar and the other terminal so arranged that one end of a conductor cord 30 may be suitably secured thereto as at 31.

A bracket 32 is mounted upon the base plate between the arms 14 and 15, this bracket being provided with reel supporting arms 33 and 34. Suitably mounted upon the bracket is an insulating block 35 and to this block is secured the supporting arm 34 out of electrical contact with the remainder of the bracket. A reel 36 is rotatably supported between the arms 33 and 34 and is designed to receive the inner end of the conductor cord 30, the arrangement being such that the cord is adapted to be wound and unwound upon the reel as the signal arm is moved from open to closed position.

While it is not absolutely necessary, I preferably provide suitable spring means for facilitating the winding of the cord upon the reel as the signal arm is moved to its inoperative position. The inner end of the conductor cord is electrically connected to an end plate 37 of the reel and this in turn is in contact with the supporting arm 34. The inner end of this arm is provided with a flange 38 constituting one contact member of a suitable switch. A spring finger 40 is mounted upon the insulating block and is provided with a free upper end portion 41 adapted to be moved to and from the contact flange 38. To the lower portion of the spring finger is suitably connected one end of a conductor wire 42, the other end of this wire extending in any suitable manner to one terminal of the vehicle battery. The other terminal of the battery will, according to the usual custom, be grounded to the metallic body portion of the vehicle, which, of course, will be in contact with the base plate 12 after the signal has been installed on the vehicle. The circuit is completed through the base plate 12, the cross bar 18, extensible arm 15, cross bar 16, and thus to the other terminal of the lamp socket.

In order to close the circuit between the spring finger 40 and flange 38, I provide a presser member 44 pivoted to the insulating block and provided with a presser foot 45 to which is secured a piece of insulating material 46. The presser foot is also provided with a longitudinally extending portion 47 so positioned as to be engaged by a depending finger 48 suitably secured to the cross bar 18.

With the device as above described, the arrangement is such that upon actuation of the lever 25 the signal arm is moved to its extended operative position. As the cross bar 18 moves downwardly with the rack 21, the finger 48 gradually comes into contact with the longitudinally extended portion 47 of the presser foot and exerts a pressure upon the same whereby the latter is moved about its pivot point. At the same time, the insulating piece 46 is moved outwardly against the spring finger 40 so that as the signal arm nears its extended operative position, the spring finger is brought into engagement with the flange 38, thus completing the circuit and lighting the lamp. After the vehicle has made the desired turn, the signal arm may then be moved to its retracted inoperative position, whereupon the finger 48 moves upwardly with the cross bar 18 and gradually relieves the pressure of the presser foot upon the spring finger 40, thereby opening the lamp circuit and extinguishing the lamp.

It should be stated that the cross bar 16 is rigidly secured to one of the lower outer links of the extensible member and is thereby moved about its axis as the member is moved from retracted position. The lamp socket, which is rigidly secured to the cross bar 16, is so positioned thereon that in the retracted position of the extensible member, said socket with the lamp will project downwardly beneath the reel 36. As the extensible member is moved to operative position the lamp will gradually move about the axis of the cross bar 16 so that in the final extended position of the member, the lamp will be in a substantially horizontal position between the arms 14 and 15 and in clear view between the outer links of said arms.

In applying my signal device to a motor vehicle of the closed car type as shown in the drawings, after a suitable hole or opening has been drilled through the side of the cowl, the shaft 24 with the lever detached therefrom is passed through the opening so that it will extend under the instrument board 49. Any suitable sleeve 50 may be secured to the back of the base plate and constitutes a bearing in which the shaft rotates and a face plate 51 and nut 52 may be suitably secured upon the sleeve interiorly of the vehicle for clamping the signal in position. I preferably position the signal so that in its inoperative position, the lever 25 will be concealed from view in rear of the instrument board. In this position, as clearly shown in full line position, Figure 6, it will be within easy reach of the operator, so that it will merely be necessary for him to reach up under the instrument board, grasp the lever by the forefinger, and rotate the same to the dotted line position whereby the signal arm will be moved from its closed to its open position.

The pinion operating shaft 24 is preferably round in configuration so that the lever 25 may be adjustable to any position that may be required according to the inside style of the car. Furthermore, if found necessary, a tapered washer 53 may be utilized for aligning the device with the cowl, according to the taper the cowl may take.

From the foregoing, it will be apparent that I have provided a compact and easily operable auto turn signal which may be positioned within easy reach of the operator and which may be instantly actuated to indicate to drivers in the rear of the car that the car is about to make a turn.

Some changes may be made in the construction and arrangement of the parts of my invention without departing from the real spirit and purpose thereof and it is intended to cover in the claims any modified forms of structure or use of mechanical equivalents which may be reasonably incurred within their scope.

I claim:—

1. In a vehicle signal, a base plate, an extensible arm mounted on said base plate, a signal lamp mounted on the outer portion of said extensible arm, an electric circuit for the lamp including a source of potential, a bracket carried by said base plate, an insulating block mounted on said bracket, a contact member mounted on said insulating block and included in the electrical circuit of said lamp, a spring finger mounted on said block normally in close proximity to said contact member and also in the lamp circuit, a presser foot of insulated material pivotally mounted on said insulating block and adapted to press said spring finger into engagement with said contact member, and means carried by said extensible signal arm for actuating said presser foot when said arm is moved to operative position.

2. In a vehicle signal, a base member, an extensible signal arm mounted on said base member, a signal lamp mounted on the outer portion of said extensible arm, an electric circuit for the lamp including a source of potential, a reel carried by said base and having an end portion thereof formed of conductive material, a conductor cord having one end thereof electrically connected to said lamp and the other end electrically connected to the conductive portion of said reel, spring means for winding the reel, one of the bearings for the reel being in electrical contact with the conductive portion thereof and constituting one element of a switch mechanism, a second switch element and means associated with said extensible arm and adapted to actuate the switch upon movement of said arm to extended position, said conductor cord, conductive portion of said reel, bearing element, and switch elements being serially included in the lamp circuit.

3. In a vehicle signal, a base member, an extensible signal arm mounted on said base member, a signal lamp mounted on the outer portion of said extensible arm, an electric circuit for the lamp including a source of potential, a reel carried by said base and having an end portion thereof formed of conductive material, and a conductor cord having one end thereof electrically connected to said lamp and the other end electrically connected to the conductive portion of said reel, spring means for winding the reel, a bearing element for said reel in electrical contact with the conductive portion of the reel, said bearing element having a rearwardly extending portion constituting one element of a switch mechanism, a second switch element, and means associated with said extensible arm and adapted to actuate the switch upon movement of said arm to extended position, said conductor cord, conductive portion of said reel, bearing element, and switch elements being serially included in the lamp circuit.

4. In a vehicle signal, a base plate, an extensible arm mounted on said base plate, a signal lamp mounted on the outer portion of said extensible arm, an electric circuit for the lamp including a source of potential, a bracket carried by said base plate, an insulating block mounted on said bracket, a contact member mounted on said insulating block and included in the electrical circuit of said lamp, a spring finger mounted on said block normally in close proximity to said contact member and also in the lamp circuit, a presser foot pivotally mounted on said insulating block and having a weighted arm normally held out of contact with said spring finger, and means carried by said extensible arm for pressing the weighted arm of the presser foot against the spring finger to close the lamp circuit when the extensible arm is moved to operative position.

5. In a vehicle signal, a base plate, an extensible arm mounted on said base plate, a signal lamp mounted on the outer portion of said extensible arm, an electric circuit for the lamp including a source of potential, a contact member included in the electrical circuit of said lamp, a spring finger positioned normally in close proximity to said contact member and also in the lamp circuit, a presser foot of insulated material pivotally supported on the base plate, and adapted to press said spring finger into engagement with said contact member, and means carried by said extensible arm for actuating said presser foot when the arm is moved to operative position.

6. In a vehicle signal, a support, an extensible signal member comprising spaced substantially parallel arms each consisting of lazy tongs mounted on said support, means for simultaneously moving said arms from collapsed to extended positions, an electric signal lamp, means for connecting and mounting the lamp adjacent the outer ends of the arms whereby the lamp will be visible through the links of the lazy tongs when in extended position and concealed from view when the lazy tongs are in collapsed position, and means for automatically illuminating the lamp when the signal member is extended.

7. In a vehicle signal, a support, an extensible signal member comprising spaced substantially parallel arms each consisting of lazy tongs mounted on said support, a cross bar connecting the outer end portions of said arms and forming lazy tong pivots, an electric signal lamp mounted on said cross bar, means for moving said arms from collapsed to extended position, means including said cross bar and lazy tongs for causing said signal lamp to assume a position visible through the links of the lazy tongs in the extended position thereof and a concealed position when said lazy tongs are collapsed, and means for automatically illuminating the lamp when the signal member is extended.

8. In a vehicle signal, a support, an extensible signal member comprising spaced substantially parallel arms each consisting of lazy tongs mounted on said support, a cross bar fixedly secured to an outer end link of each lazy tong and forming a pivot for the other outer end link of each lazy tong, an electric signal lamp mounted on said cross bar, means for moving said arms from collapsed to extended position whereby said signal lamp is visible through the links of the lazy tongs in extended position thereof and concealed from view when in collapsed position, and means for automatically illuminating the lamp when the signal member is extended.

9. In a vehicle signal, a support, an extensible signal member comprising spaced substantially parallel arms, each consisting of lazy tongs mounted on said support, a reel mounted on said support and positioned between said arms, an electric signal lamp, means for connecting and mounting said signal lamp adjacent the outer ends of said arms, whereby said lamp is made visible between the links of the lazy tongs when in extended position, and said lazy tongs when in collapsed position constitute a housing for both the lamp and reel, and a conductor cord extending between said lamp and reel and adapted to be wound upon said reel when the lamp is in inoperative position.

10. In a vehicle signal, a support, an extensible signal member comprising spaced substantially parallel arms each consisting of lazy tongs mounted on said support, a cross bar connecting the outer end portions of said arms, an electric signal lamp mounted on said cross bar, means including said cross bar for causing said signal lamp to assume a visible position between the links of the lazy tongs when in extended position, and a concealed position between the arms when said lazy tongs are collapsed, a reel mounted on said support and horizontally positioned between said arms, and a conductor cord extending between said lamp and reel and adapted to be wound upon said reel when the signal lamp is in inoperative position, said lazy tongs when in collapsed position constituting a housing for the reel.

THOMAS W. C. RUBY.